United States Patent [19]

Banks

[11] 4,282,420

[45] Aug. 4, 1981

[54] WELDING ELECTRODE

[75] Inventor: Kenneth E. Banks, Littlestown, Pa.

[73] Assignee: Chemetron Corporation, Chicago, Ill.

[21] Appl. No.: 120,449

[22] Filed: Feb. 11, 1980

[51] Int. Cl.$^3$ ............................................. B23K 35/30
[52] U.S. Cl. ......................... 219/146.24; 219/145.22; 219/146.3; 219/146.32; 219/146.41
[58] Field of Search .................... 219/145.22, 146.24, 219/146.3, 146.32, 146.41

[56] References Cited

U.S. PATENT DOCUMENTS

| | | | |
|---|---|---|---|
| 3,051,822 | 8/1962 | Bernard | 219/74 |
| 3,466,417 | 9/1969 | Chapman | 219/74 |
| 3,800,120 | 3/1974 | Helton | 219/146 |
| 3,835,289 | 9/1974 | Kakhovsky | 219/146.3 X |
| 3,868,487 | 2/1975 | Ito | 219/73 |
| 3,875,363 | 4/1975 | Arikawa | 219/146.32 X |
| 3,919,517 | 11/1975 | Ishizaki | 219/146.3 X |
| 3,924,091 | 12/1975 | Suzuki | 219/73 |
| 4,029,934 | 6/1977 | Clark | 219/145 |
| 4,125,758 | 11/1978 | Oishi | 219/126 X |

FOREIGN PATENT DOCUMENTS

| | | | |
|---|---|---|---|
| 858854 | 1/1961 | United Kingdom | 219/146.32 |
| 1076905 | 7/1967 | United Kingdom | 219/146.24 |
| 281133 | 2/1977 | U.S.S.R. | 219/146.24 |

*Primary Examiner*—Richard R. Kucia
*Attorney, Agent, or Firm*—Vincent G. Gioia; William J. O'Rourke, Jr.

[57] ABSTRACT

A flux-cored welding electrode is disclosed having a generally tubular sheath and a core defined within the sheath, wherein the core includes a slag forming system comprising from about 5 to 9 percent titanium dioxide, less than about 2 percent calcium fluoride and from about 0.003 to 0.080 percent boron, based on the total electrode weight.

10 Claims, No Drawings

WELDING ELECTRODE

BRIEF SUMMARY OF THE INVENTION

The present invention is directed to welding electrodes, and more particularly, to flux-cored welding electrodes wherein the core includes a particular rutile based slag system with a small amount of boron added thereto.

Various welding electrode compositions are disclosed in the prior art. For example, U.S. Pat. No. 3,868,491 discloses a flux-cored wire for submerged arc welding which contains a large proportion of calcium fluoride. Also, U.S. Pat. No. 3,924,091 pertains to a cored welding wire of neutral composition, i.e. having a basicity in the range of about 0.90 to 1.30. U.S. Pat. No. 4,029,934 relates to a solid steel welding wire which may contain 0.002 to 0.008% boron in the steel. And, U.S. Pat. No. 4,125,758 teaches the use of a consumable strip electrode which may contain boron.

A commercially acceptable flux-cored continuous welding electrode is disclosed in U.S. Pat. No. 3,051,822. Such electrode is employed in a welding process which utilizes a dual principal for shielding the welding operation. In particular, a slag is formed during welding to shield the molten weld metal, and a gas is used simultaneously to shield the arc column. An improved welding electrode, particularly adapted for use in vertical, or other out-of-position welding is disclosed in U.S. Pat. No. 3,800,120. The slag system employed in these contemporary, gas shielded, flux-cored electrodes are based, primarily, on titanium dioxide.

It appears that welds deposited with an electrode having a titanium dioxide based slag system may pick up titanium that has been reduced from the slag at high arc temperatures experienced during welding. It has been found that such titanium may be detrimental to the notch toughness of the weld especially in the stress relieved condition.

Accordingly, an alternative welding electrode is desired, having a slag system which though based at least in part on titanium dioxide, is able to produce a weld which exhibits improved notch toughness and impact properties.

The present invention may be summarized as providing a new and improved flux-cored welding electrode having a generally tubular sheath and a core defined within the sheath wherein the core includes a slag forming system comprising from about 5 to about 9 percent titanium dioxide, less than about 2 percent calcium fluoride and from about 0.003 to 0.080 percent boron, based on the total electrode weight.

An objective of the present invention is to provide a flux-cored electrode, which utilizes a slag system based on the oxides of titanium; for welding, wherein the weld exhibits improved notch toughness and impact properties while maintaining good operating characteristics.

An advantage of the present invention is that improved notch toughness and impact properties can be attained with rutile based electrodes.

Another advantage of the electrode of the present invention is an improvement in slag basicity while permitting the electrode to be utilized even in out-of-position welding.

These and other objectives and advantages of this invention will be more fully understood and appreciated with reference to the following description.

DETAILED DESCRIPTION

The electrode of the present invention includes a generally tubular ferrous metal sheath. The sheath is formed of the metal to be consumed and transferred to the weld. In a preferred embodiment the electrode sheath may be formed from cold rolled strip material. Such strip material may be formed into an intermediate semicircular shape. While the strip is in such semicircular configuration, the core materials, preferably homogeneously mixed together, may be poured therein. Then, the strip or sheath, is closed about the core materials. Where desired, the electrode may be drawn or rolled to sizes smaller than the originally formed electrode. It will be understood that such forming and drawing operations have the effect of compressing the core materials, eliminating any void spaces throughout the length of the electrode, and preventing shifting or segregation of the core materials during shipment or use.

The core of the electrode of the present invention comprises a mixture of slag forming ingredients, deoxidizers and alloying ingredients. Additionally, weld metal powder, such as iron powder, may also be added to the core of the flux-cored electrode of the present invention to increase the deposition rate.

The slag forming system of the electrodes of the present invention is based on the oxide of titanium, $TiO_2$. More particularly, the slag forming ingredients in the core of the electrode include from about 5.0 to about 9.0 percent titanium dioxide. The percentages stated herein are based on the total electrode weight unless specified to the contrary. Preferably titanium dioxide in the core comprises from about 6.25 to 7.75 percent of the total weight of the electrode. The titanium dioxide does not have to be in the pure form, but can be in other forms such as alkali metal titanates, leucoxene, and the like.

The slag forming system further includes from about 0.2 to 1.0 percent magnesium oxide, MgO, and not more than 2.0 percent calcium fluoride, $CaF_2$. The magnesium oxide controls surface tension and increases basicity for better mechanical properties. The calcium fluoride contributes to the cleanliness of a weld deposit, and increases the viscosity of the slag which covers and protects the weld metal from the atmosphere. The calcium fluoride together with the titanium dioxide provides a slag viscosity necessary to support the molten metal during welding especially during welding in positions other than horizontal.

The oxide of sodium, $Na_2O$, in the range of from about 0.10 to 1.0 percent, is also added to the core of the electrode. Sodium oxide serves as an arc stabilizer during welding and increases the basicity of the slag.

Basicity is an index of the oxygen potential of the flux system. It is commonly represented as a ratio of the basic oxides (including alkali oxides and other more thermodynamically stable oxides) to the acid oxides. Basicity is commonly represented by an equation such as:

$$\text{Basicity Index} = \frac{CaO + CaF_2 + MgO + K_2O + Na_2O + \frac{1}{2}(MnO + FeO)}{SiO_2 + \frac{1}{2}(Al_2O_3 + TiO_2 + ZrO_2)}$$

It is known that welding electrode flux compositions with a higher basicity have less inclusions and a potential for better toughness. Conversely, flux compositions with a lower basicity tend to have better wetting characteristics. Wetting characteristics is generally defined as the ability to form a good bond with the base material and form a deposit with a smooth surface profile. Also, lower basicity flux compositions are more likely to have all-position welding capability. As discussed above, an advantage of this invention is the provision of an improved slag system having the beneficial properties of the basic fluxes while maintaining the all-position capability and good wetting characteristics of the acid fluxes.

Deoxidizers and alloying ingredients in the core of the welding electrode of the present invention may include from about 0.30 to 2.0 percent silicon, from about 0.50 to 3.5 percent manganese, and from about 0.003 to 0.080 percent boron. Additional metals, including iron, nickel, chrome and molybdenum powder alloys, may be added to the core of the electrode to produce low alloy weld deposits. The silicon and manganese may be added to the core in a combined form such as ferrosilicon, ferromanganese, ferromanganese-silicon, calcium silicide, manganese oxide and the like. The manganese and the silicon in the core deoxidize the weld deposit, and the silicon further contributes to the out-of-position capabilities of the electrode by forming silicon oxides in the arc during welding, thereby increasing the viscosity and support capability of the slag.

However, it should be noted that silicon may have a detrimental effect on deposit toughness, as may be measured by a Charpy V-Notch impact test, and, therefore the silicon content should be minimized if good toughness is a primary goal, especially after stress relief treatments. But some silicon is necessary to deoxidize the weld deposit, control the slag viscosity and freezing characteristics, and promote the good fusion of the weld deposit to the base plate and with a smooth contour.

The specified additions of the microalloy boron in the titanium dioxide slag based electrode of the present invention, have been found to reduce the detrimental effect which titanium is known to have on the impact properties and notch toughness of a weld deposit. Welds deposited with conventional electrodes having a slag forming system based on titanium dioxide can contain titanium which is reduced from the slag at high arc temperatures. Such titanium, typically present in the deposited weld in a range of from about 0.02 to 0.07 percent, is detrimental to the notch toughness of the weld, especially in the stress relieved condition. The detrimental effect of titanium is attributed to the precipitation of titanium at the grain boundaries of the weld deposit, perhaps in the form of a carbonitride.

It is also known that the heat input of the flux-cored welding process, when welding with a conventional titanium dioxide slag based electrode, results in the formation of a large percentage of grain boundary proeutectoid ferrite. Acicular ferrite is also found between the long columnar grains of such proeutectoid ferrite. Large percentages of proeutectoid ferrite has been found to be detrimental to the impact properties of a deposited weld since they provide areas which offer little or no resistance to the propagation of a crack.

Welds deposited with the electrode of the present invention have been found to exhibit improved notch toughness and impact properties, more particularly, the titanium has less of an adverse effect on the impact properties of a weld deposit when boron has been added to the slag system of the electrode. It appears that the titanium acts to provide the internal shielding necessary to protect the boron from oxidation or forming a nitride. Also, the boron in the electrode of the present invention promotes grain refinement. In particular, when boron, in the range of from about 0.003 to 0.080 percent, is added to the core of the electrode, less proeutectoid ferrite, and more acicular ferrite is formed during solidification of the weld. Also, with the electrode of the present invention, the remaining proeutectoid ferrite grains become discontinuous further improving the impact properties of the deposited weld.

A gas shield is preferably provided about the arc when welding with the electrode of the present invention. Shielding gases may include, by way of example, carbon dioxide, carbon dioxide-argon mixtures, and argon-oxygen mixtures. Preferably, welds are deposited with the electrode of the present invention with about 75% argon/25% carbon dioxide shielding. It has also been found that a current value in a range of from about 150 to 300 amperes at about 20 to 30 volts is sufficient to weld with the electrodes of the present invention, particularly in the vertical position.

Table I below sets forth the chemical composition of three exemplary electrodes of the present invention:

TABLE I

| Electrode Constituents | Composition Amount (% of total electrode weight) | | |
|---|---|---|---|
| | Example 1 | Example 2 | Example 3 |
| $TiO_2$ | 6.87 | 7.21 | 7.21 |
| MgO | 0.48 | 0.51 | 0.49 |
| $CaF_2$ | 0.06 | 0.06 | 0.07 |
| $Na_2O$ | 0.44 | 0.46 | 0.45 |
| Si | 0.66 | 0.70 | 0.70 |
| Mn | 2.17 | 2.28 | 2.45 |
| Ni | — | 0.75 | 1.68 |
| Cr | — | — | — |
| Mo | — | — | 0.35 |
| B | 0.018 | 0.019 | 0.020 |
| Fe | remainder | remainder | remainder |
| Description | mild steel | low transition temperature alloy | low alloy, high strength |

The chemistry of the weld deposited vertically upward with the electrodes set forth in the above examples, with a 75% argon/25% carbon dioxide shielding gas and a current value of about 200 amperes at about 23 volts, are set forth in Table II below. It should be understood that other welding parameters would be optimum for welding in other positions.

TABLE II

| Weld Deposit Constituents | Amount (% by weight) | | |
|---|---|---|---|
| | Example 1 | Example 2 | Example 3 |
| C | 0.052 | 0.047 | 0.046 |
| Mn | 1.43 | 1.32 | 1.48 |
| Si | 0.37 | 0.35 | 0.42 |
| Ti | 0.03 | 0.029 | 0.036 |
| B | .004 | .004 | .004 |
| Cr | — | — | — |
| Ni | — | 0.85 | 1.79 |
| Mo | — | 0.01 | 0.39 |

The physical properties of the welds specified in the above examples for both flat and vertical welding positions are set forth in Table III below:

TABLE III

| | Example 1 | | | | Example 2 | | | | Example 3 |
|---|---|---|---|---|---|---|---|---|---|
| | Flat | | Vertical (up) | | Flat | | Vertical (up) | | Vertical (up) |
| Welding position Heat Treatment | as welded | stress* relieved | as welded | stress* relieved | as welded | stress* relieved | as welded | stress* relieved | as welded |
| Tensile Strength (Ksi) | 87.7 | 85.7 | 87.2 | 82.3 | 87.1 | 85.0 | 86.2 | 86.1 | 120.5 |
| Yield Strength (Ksi) | 77.5 | 73.5 | 75.0 | 69.6 | 75.7 | 72.5 | 75.5 | 72.8 | 113.5 |
| Elongation (%) | 27 | 29 | 27 | 31 | 27 | 27 | 29 | 29 | 18 |
| Reduction of Area (%) | 70.1 | 69.3 | 69 | 72.7 | 67 | 70 | 71 | 69.6 | 55.7 |
| Impact Strength (ft. lb.) | | | | | | | | | |
| @ 0° F. | 84–89 | 73–90 | 91–109 | 89–94 | 75–89 | 47–61 | 76–79 | 65–70 | — |
| @ −20° F. | 82–88 | 71–76 | 93–98 | 41–62 | 72–79 | 43–47 | 72–84 | 41–52 | — |
| @ −40° F. | 71–78 | 61–64 | 82–86 | 36–44 | 71–74 | 35–47 | 60–64 | 26–48 | — |
| @ −60° F. | — | — | — | — | 45–63 | 24–38 | 43–56 | 26–33 | 28–34 |
| @ −80° F. | — | — | — | — | 39–53 | — | 26–40 | — | — |

*Stress relieved 8 hours at 1150° F.

Additional exemplary weld deposit chemistries provided by welding with electrodes of the present invention having the same electrode composition, with 0.003 to 0.080 boron additions and different electrode diameter are set forth below in Table IV.

TABLE IV

| Weld Deposit Constituents | Amount (% by weight) | |
|---|---|---|
| | Example 4 | Example 5 |
| C | .048 | .048 |
| Mn | 1.52 | 1.41 |
| Si | .40 | .39 |
| P | .006 | .006 |
| S | .017 | .017 |
| Ni | .95 | .92 |
| electrode diameter (inch) | .045 | 1/16 |
| shielding gas | 75% Ar/25%CO$_2$ | 75% Ar/25% CO$_2$ |

The physical properties of flat and vertically deposited welds set forth in examples 4 and 5 are set forth below:

TABLE V

| | Example 4 | | | | Example 5 | | | |
|---|---|---|---|---|---|---|---|---|
| | Flat | | Vertical | | Flat | | Vertical | |
| Welding position Heat Treatment | as welded | stress* relieved | as welded | stress* relieved | as welded | stress* relieved | as welded | stress* relieved |
| Tensile Strength (Ksi) | 101 | 95 | 101 | 92 | 93 | 91 | 90 | 85 |
| Yield Strength (Ksi) | 92 | 85 | 88 | 83 | 82 | 79 | 79 | 70 |
| Elongation (%) | 24 | 25 | 20 | 25 | 26 | 26 | 28 | 28 |
| Reduction of Area (%) | 61 | 68 | 57 | 68 | 69 | 68 | 68 | 71 |
| Impact Strength (ft. lb.) | | | | | | | | |
| @ −40° F. | 58–65 | 34–41 | 50–56 | 29–40 | 25–27 | 23–34 | 48–55 | 23–37 |
| @ −60° F. | 32–47 | 16–18 | 37–42 | 11–22 | 19–25 | 13–31 | 35–38 | 14–15 |
| @ −80° F. | 34–50 | 6–9 | 38–43 | 9–11 | 10–18 | 8–14 | 35–41 | 9–14 |
| Welding Current Amperes | 280 | | 220 | | 280 | | 230 | |
| Volts | 27 | | 23 | | 26 | | 23 | |

*Stress relieved 8 hours at 1150° F.

The following examples further demonstrate the beneficial effect of boron and the detrimental effect of silicon on the toughness of the weld deposits. The deposits set forth below were provided with electrodes having a slag system within the ranges stated above and are included to show the effect of the alloy additions on the mechanical properties.

| Deposit Analysis (%) | Example 6 | Example 7 | Example 8 | |
|---|---|---|---|---|
| C | .054 | .054 | .057 | |
| Mn | 1.24 | 1.24 | 1.37 | |
| Si | .45 | .48 | .66 | |
| P | .005 | .005 | .005 | |
| S | .015 | .015 | .015 | |
| Ni | 2.39 | 2.25 | 2.42 | |
| Boron Addition | none | .015 | .015 | |
| CVN Impact Strength (ft-lb) | | | | |
| As welded −80° F. | 27, 30 | 47, 45 | 31, 31 | |
| Stress relieved −20° F. | 58, 58 | 58, 49 | 29, 29 | |
| −40° F. | 12, 8 | 43, 29 | 8, 9 | |

Example 6 is directed to a weld deposit containing a nominal 2% nickel alloy content without boron. Example 7 is identical to Example 6, but contains a preferred boron addition for this alloy. Example 8 is the same as Example 7 but contains a higher silicon and slightly higher manganese content. The impact strength values demonstrate the benefits of the boron addition and the importance of minimizing the silicon levels.

What is believed to be the best mode of this invention has been described above. It will be apparent to those skilled in the art that numerous variations of the illustrated details may be made without departing from this invention.

What is claimed is:

1. A welding electrode having a generally tubular ferrous metal sheath, and a core defined within the sheath for use in gas shield welding wherein the shielding gas is selected from the group consisting of carbon dioxide, inert gas, oxygen and inert gas mixtures, and mixtures thereof, said core comprising, by total weight of the electrode, from about 5.0 to 9.0% titanium dioxide,
from about 0.2 to 1.0% magnesium oxide,
up to about 2.0% calcium fluoride,
from about 0.1 to 1.0% sodium oxide,
from about 0.2 to 2.0% silicon,
from about 0.5 to 3.5% manganese,
from about 0.003 to 0.08% boron, and
the balance consisting of an alloy powder selected from the group consisting of nickel, chrome, molybdenum, iron and mixtures thereof.

2. A welding electrode as set forth in claim 1 wherein the core comprises from about 6.0 to 8.0% titanium dioxide.

3. A welding electrode as set forth in claim 1 wherein the core comprises from about 0.3 to 0.7% magnesium oxide.

4. A welding electrode as set forth in claim 1 wherein the core comprises from about 0.04 to 0.09% calcium fluoride.

5. A welding electrode as set forth in claim 1 wherein the core comprises from about 0.5 to 0.9% silicon.

6. A welding electrode as set forth in claim 1 wherein the core comprises from about 2.0 to about 2.5% manganese.

7. A welding electrode as set forth in claim 1 wherein the core comprises from about 0.015 to 0.030% boron.

8. A welding electrode as set forth in claim 1 wherein the core comprises from about 0.75 to 3.0% of an alloy powder selected from the group consisting of nickel, chrome, molybdenum, iron and mixtures thereof.

9. A welding electrode as set forth in claim 1 wherein the core comprises from about 0.75 to 3.0% nickel.

10. A welding electrode having a generally tubular ferrous metal sheath, and a core defined within the sheath for use in gas shield welding wherein the shielding gas is selected from the group consisting of carbon dioxide, inert gas, oxygen and inert gas mixtures, and mixtures thereof, said core comprising, by total weight of the electrode, from about 6.0 to 8.0% titanium dioxide,
from about 0.3 to 0.7% magnesium oxide,
from about 0.04 to 0.09% calcium fluoride,
from about 0.4 to 0.6% sodium oxide,
from about 0.5 to 0.9% silicon,
from about 2.0 to 2.5% manganese,
from about 0.015 to 0.030% boron, and
from about 0.75 to 3.0% nickel.

* * * * *